Patented June 29, 1937

2,085,500

UNITED STATES PATENT OFFICE 2,085,500

TREATMENT OF OXYGEN DERIVATIVES OF HYDROCARBONS IN WHICH ALIPHATIC HYDROCARBONS PREDOMINATE

Joseph Hidy James, Pittsburgh, Pa., assignor to Clarence P. Byrnes, trustee, Sewickley, Pa.

No Drawing. Application March 26, 1924, Serial No. 702,136

16 Claims. (Cl. 260—99.12)

In various copending applications, including my application Serial No. 435,355, filed January 6, 1921, I have disclosed partial oxidation processes for the treatment of mineral oils, including petroleum, shale oil and the oil or tar produced by the low temperature distillation of coal. In such method, the oil or fraction thereof is vaporized, mixed with air, and the mixture passed at a regulated temperature below a red heat in contact with a catalyst, such as the oxides or compounds of molybdenum, vanadium, etc. The condensed products of this partial oxidation process extend from alcohols through aldehydes to aldehyde fatty acids, all of varying molecular weights, depending upon the fraction employed for the process.

My present invention relates to the treatment of such mixtures containing oxygen derivatives of hydrocarbons in which aliphatic hydrocarbons predominate, in the range from alcohols to acids which, according to the present invention, I fractionally distill preferably by a vacuum process into separate fractions. I have found that where careful fractionation is employed, there is a gradation in properties of both the saponifiable and non-saponifiable portions of each fraction of the product treated, in passing from the fraction of lowest average molecular weight to that of highest average molecular weight, which it is possible to vaporize under the best distillation means. Steam is preferably employed in connection with this vacuum distillation, as it aids in vaporization and also serves to hydrolize the wax-like bodies and anhydrides that are present. The vacuum distillation was employed in order to vaporize each fraction at the lowest possible temperature, thus causing the least possible formation of decomposition products. Each such fraction of the product contains a material percentage of oxygen derivatives other than acids and in the range from alcohols up to acids.

The following are examples of treatments of the product mixture from the main oxidation process, the raw material of which was a mixture of 75% Pennsylvania petroleum refinery wax distillate (untreated) and 25% of ordinary Pennsylvania petroleum gas oil. Such oils are mainly aliphatic. The condensed oily oxidation product mixture was about 85% by volume of the raw oil charged. The specific gravity of the condensed product was .892 at 60° F.

The Engler distillation on the oxidation product mixture showed the following:

| | Per cent by volume |
|---|---|
| Under 200° C | 15 |
| 200 to 250° C | 30 |
| 250 to 300° C | 20 |
| 300 to 350° C | 15 |
| 350 to 400° C | 10 |
| Residue | 10 |

This product was then subjected to a vacuum steam distillation carried out on several liters of the product, the various cuts being taken at approximately the volumes above shown. In the further description, I shall refer to each of the portions by its atmospheric pressure distillation range, it being understood that the particular fraction discussed was not separated by atmospheric pressure distillation, but that a cut corresponding to this distillation was made by taking the same percentage volume in the vacuum steam distillation.

Procedure with the "under 200° C. fraction" (method A)

This portion was boiled under an inverted condenser with a 20% solution of caustic soda for seven hours. The volume of fraction taken was 500 cc. and the volume of 20% caustic was 100 cc. On cooling, a solid cake of soap separated, this being a mixture of sodium soaps of the resinified aldehyde acids of this fraction. These resin acids were then liberated from the soap by adding a slight excess of dilute sulphuric acid. The resin acids thus liberated were of a brick red color, completely soluble in alcohol and in benzol, and without further purification, showed a softening point of 175° C. and were completely melted at 210° C.

With the resins of this and of all other fractions, I discovered that if they are washed with certain solvents, such as petroleum, ether or gasoline, I can wash out a small amount of oil and softer acids, thus raising both the softening and the melting points of the resins and also improving the colors of the remaining resin acids. This is an important feature of my invention, as it may be applied to any and all such resins and will greatly improve them, both by raising the melting point and improving them in color.

The non-saponifiable portion of this fraction is amenable to the ordinary decoloring and deodorizing processes known to industrial chemists. For example, when this portion or fraction is subjected to the ordinary sulphuric acid and caustic soda agitations and to subsequent re-distillation, a product is obtained which is almost water white in color and has a pleasant ethereal odor. This product is suitable for a solvent, for motor fuel, or for a thinner or turpentine substitute in the paint and varnish industry.

In certain cases in the latter industry, the purification treatment need not be resorted to, as there is sufficient concentration of aldehydes, ketones and ethers in this fraction to make it of great value as a thinner where a slight color is not objectionable.

*Procedure with the "under 200° C. fraction" (method B)*

This method may be applied to the first fraction where it is desired to obtain either the aldehyde acids or the aldehydes in as high a state of purity as possible. In this case, instead of saponifying with caustic soda, I employ calcium hydroxide, as I have found that this reagent brings about very slight resinification of the aldehydic substances. In this procedure the fraction is boiled under an invert condenser with an excess of calcium hydroxide solution, starting with five volumes of the oxidation product fraction and one volume of the lime water solution and adding more of the lime solution as the reaction proceeds.

The calcium soaps may then be decomposed by a suitable mineral acid in the presence of alcohol, to form esters of the organic acids present; or the liberated acids may now be resinified caustic soda by a treatment similar to that above recited under "A" process.

By the lime saponification, a product of a good color is obtained from a non-saponifiable layer without further treatment. This method is particularly applicable where it is desired to isolate the aldehydes for any purpose. All that is necessary is to agitate the non-saponifiable layer with a saturated or nearly saturated solution of sodium bisulphite, later removing and decomposing the aldehyde-bisulphite compound. Any ketones present are removed along with the aldehydes.

The non-aldehydic portion will contain many oxidation derivatives, such as alcohols, ethers and possibly "bridge" oxygen derivatives of the original hydrocarbons.

*Procedure with the 200 to 250° C. fraction (method A)*

When the saponification is carried out as in the preceding "A" treatment with no further treatment, a mixture of resin acids which softened at 160° C. and became completely fused at 175° C. was obtained. These resins are easily soluble in alcohol and in benzol.

The non-saponifiable oil here obtained can not be put to any of the uses referred to in the "A" method of the preceding fraction, because of its higher boiling range. This non-saponifiable oil may, after the removal of the acids, be utilized as a "furnace" oil, and is of special advantage in gravity feed burners. On account of its containing oxygen compounds, this material is readily combustible. Tests have shown that the combustion is clean and complete, leaving no carbon or tarry matters; whereas the ordinary kerosene hydrocarbon mixture in the same boiling range produces sooting and clogging under the same draft and gravity burner conditions. This fraction may be used alone as a furnace oil or it may be blended with ordinary hydrocarbons of either the same range or even of higher boiling range, since it acts as a kindling oil for the ordinary hydrocarbon and greatly minimizes the smoking and sooting thereof under burner conditions.

Where this non-saponifiable fraction is not used as a furnace oil, it may be readily handled by returning it to the oxidizing apparatus, either alone or mixed with fresh oil. Where this is done, I have found that the partially oxidized oil is always attacked and oxidizes more readily than fresh oil when subjected to the air-vapor catalytic oxidation. If it is desired to isolate the aldehydes and ketones in this fraction, the saponification and separation of the acids should be carried out with calcium hydroxide, as above noted under procedure "B" for the first fraction, followed by bisulphite treatment.

The calcium soaps may, if desired, be decomposed by a suitable mineral acid in the presence of alcohol to make esters in a manner similar to that above noted under the first fraction.

*Procedure with the 250 to 300° C. fraction*

This fraction will, in general, be handled the same as the 200 to 250° C. cut, but the resin acids will have lower melting points and the non-saponifiable oil will have a higher boiling range. The untreated resin acids should soften in the neighborhood of 145° C. The removal of aldehydes and ketones should in this case preferably be preceded by calcium hydroxide treatment, as before noted.

*Procedure with the 300 to 350° fraction (method A)*

This method is carried out the same as in the preceding groups, and the resin acids will have still lower melting points. For example, with the wax distillate gas oil product which I have described, resin acids were obtained from this cut which, when untreated, softened at 132° C. and were completely melted at 138° C. These resins were dissolved almost completely (95%) in alcohol and were completely dissolved in benzol.

*Procedure with the 300 to 350° C. fraction (method B)*

In this method, I saponify the acids and their combinations with calcium hydroxide, using the resulting calcium soaps in grease manufacture. The non-saponifiable oil may be returned to the oxidizer or may be used for lubrication where a thin oil is desired.

*Procedure with the 300 to 350° C. fraction (method C)*

This method involves the sulphonation of the total 300 to 350° C. cut. I prefer to carry out this sulphonation as follows: 5 volumes of the oxidized oil of this cut are treated with one volume of fuming sulphuric acid (approximately 102 oleum) by dropping the acid slowly into the oil with violent agitation, keeping the temperature below 50° C. and continuing the agitation for three hours after all of the acid is added. When the reaction mixture is allowed to stand for from 48 to 72 hours, the excess sulphuric acid, together with water and a considerable quantity of the sulphonated organic product, settles to the bottom. The "top oil" layer here contains the sulphonated and other acids that are soluble in the oil. It is better to draw this off carefully from the sulphuric layer below and saponify by agitation with hot caustic soda or sodium carbonate solution. If a soluble oil is desired, it is possible by careful addition of alkali to saponify the sulphonated and other acids and leave a sufficient amount of soda soap in the oil to completely emulsify it when water is added. A good plan here is to saponify to this point by heating the oil with dry caustic soda when the greater part of the soap remains in solution in the oil.

Instead of saponifying the acids in the "top" oil by caustic soda or sodium carbonate, as above, I may use calcium hydroxide and thus convert the whole top oil layer into a grease.

I may saponify with caustic soda or sodium carbonate as above and remove the soda soaps by repeated washings, utilizing the separated soaps as cheap detergents.

The "sulphuric" layer above referred to is treated with sodium chloride or sulphate to "salt out" the organic acids. This process is repeated on the water emulsion of the sulphonated acids until the layer of organic acids is obtained free from sulphuric acid. This also consists almost completely of saponifiable matter (sulphonated acids, oxygenated acids and ordinary fatty acids) and is amenable to easy saponification in the usual way by caustic soda or carbonate of soda. There is thus produced a very good soap that can be utilized in the coarser kinds of cleaning. It froths readily and emulsifies oils more readily than do the ordinary commercial soaps.

*Procedure with 350 to 400° C. fraction (method A)*

This method is that of isolating the resin acids as outlined for the preceding fractions. Here, however, this is usually not advisable, as the resins from the foregoing wax distillate gas oil oxidation mixture were darker in color than those from the lighter fractions and showed a softening point of 62° C. and were completely melted at 66° C. Their solubility was almost identical with that of the resins from the preceding fraction.

*Procedure with 350° to 400° C. fraction (method B)*

There is present in this fraction an oxidation mixture of sufficiently high average molecular weight to show in the acids the characteristics of the ordinary commercial fatty acids. Hence, for example, by saponifying with calcium hydroxide, that is, by agitating the total fraction with calcium hydroxide solution, we can make a lime soap grease in one operation as it is not necessary to make a separation of the acids from the oil in this case.

*Procedure with 350° to 400° C. fraction (method C)*

This method relates to the sulphonation of the fraction and is carried out in a manner almost identical with that outlined for the third method of the preceding fraction. Here again it should be noted that the high average molecular weight of the acids and the non-saponifiable oil imparts to the oxidation mixture the characteristics of the ordinary fatty acids and fatty oils.

In all the foregoing outlines, I have considered those oxidation products of hydrocarbons which were condensable under ordinary conditions of temperature and pressure, this being the mixture obtained at condensers in the ordinary operation of the catalytic vapor-phase oxidation.

*Procedure with scrubber product*

There is, however, another product which also consists of a mixture of oxidation compounds and which does not ordinarily condense with the products above noted, but is usually carried on past the condensers with the effluent gas stream. If a scrubbing system be installed in series with the condensers and the scrubbing liquid consist of lime water or a solution of, say, soda ash, I can almost completely remove these low molecular weight bodies from the gas vapor effluent. I have found these particular bodies to be most active toward the resinification reaction, of any of the acids formed in the catalytic oxidation process. Because of this fact, it is preferable in most cases to use lime water in the scrubbing system, as this is the mildest cheap alkali available. Even on warming the solution of these calcium soaps (since these calcium soaps are more soluble in water than those from any of the preceding oxidation products described) calcium resinates are obtained which become darker brown as the heating continues. The color of the resin acids liberated and the degree of resinification depend on the time during which the alkali or alkaline earth metal soaps are heated in contact with the free alkali or the free alkaline earth metal hydroxide. Where sodium carbonate or caustic soda is the alkali used in the scrubbing solution, the resinification may be carried to the point of making brown resins that are infusible and insoluble in any of the ordinary solvents, such as alcohol, benzol, etc.

Where these soaps are in solution, I may bleach them by treating the solution with a stream of chlorine gas. Passage of the gas may be continued until enough acid has been formed to liberate the bleached resin acids. I have also found that if dilute sulphuric acid be used to liberate the acids already resinified, chlorine may be used on the remaining acids in solution to resinify and finally precipitate the bleached resin acids formed.

*Washing method of acid separation*

In addition to the foregoing procedures for the separation of the resin acids of the various fractions, it is possible with each fraction to separate these acids into two or more groups, each group having different properties, by the selective action of certain solvents. For example, as noted in the description of the products of the first fraction, I have found that if the resins of a certain fraction be agitated with petroleum ether or gasoline, two groups of acids are obtained, one group being insoluble in petroleum ether or gasoline and having a much higher melting point than the original mixture of resins, and of course, a much higher melting point than the portion soluble in petroleum ether or gasoline. I have found after much experimentation that the application of the gasoline wash raises the melting point of the resins of a certain fraction which are not soluble in the wash by from 20 to 30 or even 50° C. It is remarkable that even comparatively small portions of the gasoline-soluble acids will cause the melting point to fall below 100° C. Amounts as low as 5% of the gasoline-soluble acids will keep the melting point too low for many purposes, and yet the simple washing method above described will result in a yield of from 90 to 95% of a resin mixture melting from 20° C. to 30° C. higher.

By treating any of the above resinified products from the oil fractions, preferably while in the form of their soluble soaps, (usually sodium or potassium soaps), with chlorine in the water solution, bleached resins of fine appearance can be obtained. Usually such resins, like practically all those above described, are soluble in alcohol or in benzol or in mixtures of these two solvents.

In all my processes of resinification, the property of the product obtained was determined by several factors, of which I believe the following to be the main ones:

(1) Chemical character of the hydrocarbons originally subjected to the air-vapor-catalytic-oxidation;

(2) The particular fraction of the product from which the resins have been separated;

(3) The method of resinification. This is described in my copending application Serial No. 520,715, for the renewal of application Serial No. 395,942, filed July 13, 1920 and also in this application. Generally speaking, the milder the alkali used, the less will be the resinification. For example, it is possible in the case of the calcium soaps of low molecular weight acids to obtain sufficient resinification by the use of lime only, while if these acids be liberated from the calcium and be further resinified by caustic soda solution, I obtain resins practically infusible and insoluble. A convenient method of separating and resinifying the acids of a given reaction mixture is to carry out the saponification with a mixture of sodium carbonate and calcium hydroxide (slaked lime). I prefer to keep the calcium hydroxide in excess, for example, I may use from 8 to 10 grams molecular weights of calcium hydroxide to one g. mol. of sodium carbonate. This enables me to utilize the action of a dilute solution of caustic soda in saponification and to continuously remove the soaps formed, as insoluble calcium soaps. The removal of these soaps from the sphere of the reaction hastens the saponification of the remaining acids and acid compounds and anhydrides present in the reaction mixture.

Such a mixture may also be used as a scrubbing liquid to aid in the further recovery of the volatile oxidized acids from the gas vapor stream beyond the condenser.

(4) The degree of oxidation to which a given mixture is subjected. In general, this works toward the higher petroleum ether insoluble resins, where the oxidation has been more vigorous. These resins are of higher melting point in a given fraction and more difficultly soluble than the petroleum-ether soluble acids. Where the oxidation has been vigorous, the concentration of caustic used in saponification and resinification becomes of minor importance. In addition where color is an important factor in the resin produced, I may bleach the product by taking the water solution of the sodium resinates and passing chlorine gas into the solution or by treating the solution with a solution of sodium hypochloride. Where chlorine is used, I may proceed with the chlorine treatment until hydrochloric acid is formed in sufficient amount to liberate the bleached resin acids, without further mineral acid treatment. I may also pass chlorine into a suspension of the calcium resins, although this method is not as effective as the sodium method above. Treating either the original fraction or the sodium soap with a solution of bleaching powder may also be used.

Where it is desired to improve certain physical properties of the resin acids, such as toughness and elasticity, I can accomplish this by taking any of the foregoing resin acids and forming their glycerine esters. This is usually carried out by heating the resin acid mixture with an excess of glycerine, usually aiding the esterification by the addition of a small percentage of sulphuric acid or by passing a stream of dry hydrochloric acid gas through the heated solution. After the esterification is complete, the excess glycerine is easily recovered by adding water to the cooled reaction mixture and the esterified resin acids filtered off and washed.

I claim:

1. In the treatment of partial oxidation products in the range from alcohols to organic acids and containing hydrocarbon derivatives other than acids, the steps consisting of separating from the same a plurality of fractions, each containing a material percentage of derivatives other than acids, and chemically treating at least one of said fractions.

2. In the treatment of a liquid partial oxidation product in the range from alcohols to organic acids and containing hydrocarbon derivatives other than acids, the steps consisting of separating from the same a fraction by distillation containing a material percentage of aliphatic derivatives other than acids, then converting a portion of said fraction into resin acids and removing impurities from said acids.

3. In the treatment of a liquid partial oxidation product in the range from alcohols to organic acids and containing hydrocarbon derivatives other than acids, the steps consisting of separating from the same a fraction by distillation containing a material percentage of aliphatic derivatives other than acids, and then saponifying a portion of said fraction, separating the saponified from the unsaponified portion of said fraction, and bleaching the saponified portion.

4. In the treatment of a liquid partial oxidation product in the range from alcohols to organic acids and containing hydrocarbon derivatives other than acids, the steps consisting of separating from the same a fraction by distillation containing a material percentage of aliphatic derivatives other than acids, then saponifying a portion of said fraction with lime, and separating the saponified from the unsaponified portion of said fraction.

5. In the treatment of a liquid partial oxidation product in the range from alcohols to organic acids and containing hydrocarbon derivatives other than acids, the steps consisting of separating from the same a fraction by distillation containing a material percentage of aliphatic derivatives other than acids, then saponifying a portion of said fraction with soda and lime, and separating the saponified from the unsaponified portion of said fraction.

6. In the treatment of partial oxidation products of hydrocarbons, the steps consisting of resinifying at least a portion thereof, and then washing out of said resinified material the lower-melting-point portions thereof.

7. In the treatment of liquid partial oxidation mixtures in the range from alcohols to aldehyde fatty acids, the steps consisting of vacuum distilling the same into fractions of different average molecular weight, and then chemically treating at least one of the fractions to form chemical compounds of portions of said fractions, and separating said compounds.

8. In the treatment of liquid partial oxidation mixtures in the range from alcohols to aldehyde fatty acids, the steps consisting of steam vacuum distilling the same into fractions of different average molecular weight, and then chemically treating at least one of the fractions to form chemical compounds of portions of said fractions, and separating said compounds.

9. In the treatment of a partial oxidation product having hydrocarbons which already contain artificially-introduced chemically-combined oxygen to different degrees of oxidation, and which contain like bodies of different molecular weights, the steps consisting of fractionating the same into liquid fractions of different average molecular weights and treating the lighter fractions with a resinifying agent.

10. In the treatment of partial oxidation products in the range from alcohols to organic acids and containing hydrocarbon derivatives other than acids, the steps consisting of separating from the same a plurality of fractions, each containing a material percentage of derivatives other than acids, and sulphonating a heavier fraction whose major portion consists of bodies boiling over 300° C.

11. In the treatment of a mixture of oxygen derivatives of hydrocarbons in which aliphatic hydrocarbons predominate containing alcohols and having a boiling point above 300° C., the step consisting of sulphonating the same.

12. In the treatment of a mixture of oxygen derivatives of hydrocarbons in which aliphatic hydrocarbons predominate containing alcohols and having a boiling point above 300° C., the step consisting of sulphonating the same and then saponifying.

13. As a new composition of matter, a mixture of sulphonated oxygen derivatives of hydrocarbons in which aliphatic hydrocarbons predominate having a boiling point above 300° C.

14. As a new composition of matter, a detergent containing essentially a sulfonated and saponified mixture of oxygen derivatives of hydrocarbons in which aliphatic hydrocarbons predominate having a boiling point above 300° C.

15. As a new composition of matter, a sulphonated and saponified fraction of a mixture of oxygen derivatives of hydrocarbons in which aliphatic hydrocarbons predominate having a boiling point above 300° C.

16. As a new composition of matter, the reaction product of sulphuric acid and a fraction boiling over 300° C. of a mixture of oxygen derivatives of hydrocarbons in which aliphatic hydrocarbons predominate, said derivatives being other than acids and in the range from alcohols up to acids.

JOSEPH HIDY JAMES.